J. V. SCHMID.
BLOW-OFF VALVE.
APPLICATION FILED MAY 29, 1908.
937,096.
Patented Oct. 19, 1909.
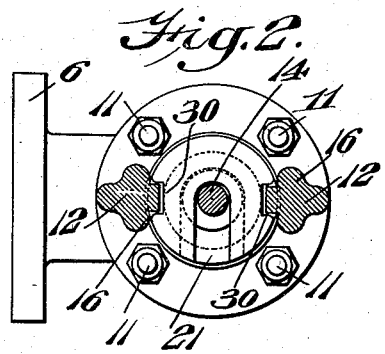
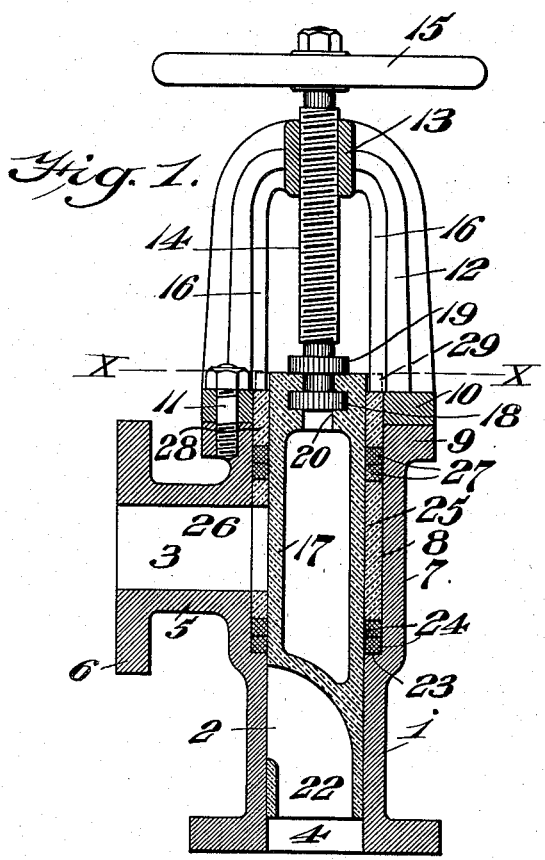
Witnesses
H. G. Dieterich
L. Douville
Inventor
John V. Schmid
By Wiedersheim & Fairbanks
Attorneys

UNITED STATES PATENT OFFICE.

JOHN V. SCHMID, OF PHILADELPHIA, PENNSYLVANIA, ASSIGNOR TO THE SIMPLEX ENGINEERING CO., OF PHILADELPHIA, PENNSYLVANIA, A CORPORATION OF PENNSYLVANIA.

BLOW-OFF VALVE.

937,096.  Specification of Letters Patent.  Patented Oct. 19, 1909.

Application filed May 29, 1908. Serial No. 435,817.

*To all whom it may concern:*

Be it known that I, JOHN V. SCHMID, a citizen of the United States, residing in the city and county of Philadelphia, State of Pennsylvania, have invented a new and useful Blow-Off Valve, of which the following is a specification.

This invention relates to valves and more particularly to that class of valve known as blow-off valves for use in connection with steam boilers. It is well known that valves of this type are located at a point in the boiler where the sediment and other deleterious materials in the water of a boiler collect in large quantities and if the valve is not properly designed the seat thereof and adjacent parts will soon become so worn as to require the replacing of most of the working parts of the valve.

It is the object of my invention to provide a valve which will be free from the above troubles, one in which it is impossible for the scale and sediment to reach the operating parts, which are sufficiently protected so that they are never in contact with any of the blow-off products.

My object further consists in providing a valve consisting of a reciprocating plunger operating with a smooth bore and provided with coöperating parts which adjust suitable packing members entirely independent of the means for reciprocating the plunger but which, however, operate simultaneously therewith.

It further consists of other novel features of construction, all as will be hereinafter fully set forth.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a vertical section through a valve embodying my invention. Fig. 2 represents a section on line $x$—$x$, Fig. 1.

Similar numerals of reference indicate corresponding parts in the figures.

Referring to the drawings:—1 designates a substantially cylindrical casing having a bore 2 therethrough and communicating with which is an inlet opening 3 and outlet opening 4, the former of which passes through a tubular extension 5 of the main casing 1 and has preferably integral therewith laterally extending flanges 6 which serve to attach the casing to a suitable pipe line. The casing 1 is provided with an enlarged portion 7 in order to provide for a counterbore 8, for a purpose to be hereinafter described. The enlarged portion 7 of the casing 1 terminates in an outwardly extending flange 9 provided for the purpose of receiving a cap plate 10 secured thereto in any suitable manner, in the present instance by means of the stud bolts 11 spaced at suitable intervals.

12 designates a yoke formed preferably integral with the plate 10 and having a hub 13, screw threaded to receive a threaded rod 14, on the end of which is a hand operated wheel 15. The yoke 12 is provided with ribs 16, the purpose of which will presently appear. The rod 14 has detachably secured thereto a hollow plunger 17, the securing means for which, in the present instance, consists of a plurality of disks 18 and 19 spaced apart on the rod 14, one of which is adapted to fit within a recess 20 of the plunger 17, a slot 21 being provided for the proper positioning of the disk 18 in said recess 20, whereby the rod 14 and the plunger 17 are securely fastened together.

22 designates an angular channel formed within the plunger 17, one end of which is adapted to communicate with the outlet 4 and the other end, when correctly positioned, communicates with the inlet 3. It will thus be seen that if the plunger 17 is raised sufficiently the inlet 3 will have a direct communication with the outlet 4 through the channel 22 while if the plunger is moved sufficiently within the bore, communication between the inlet and outlet is entirely cut off. It is well known in apparatus of this type which is exposed to the action of scale and the like, that the seat becomes worn, the valve loose and its efficiency very much impaired. In order to prevent wear of this kind I provide the counterbore 8 which forms a seat 23, the same being engaged by suitable packing rings 24, and being maintained in place by a sleeve 25 surrounding the plunger 17 and having an opening 26 in one side adjacent the inlet 3. It will be clear that this sleeve prevents any sediment from working its way around behind the plunger 17 and wearing away the side wall of the casing 1.

27 designates packing rings positioned on the sleeve 25 for a purpose similar to that already described for packing rings 24. These sets of packing rings are acted upon by an annular ring 28 surrounding the plunger 17 at its upper end and adapted to be engaged by a flange 29 formed on the end of the plunger 17. This flange 29 is provided with apertures 30 for the reception of the ribs 16 whereby rotary displacement of the plunger is prevented and a straight up and down sliding movement communicated to the plunger.

In the operation of this valve the hand wheel 15 is rotated so that the plunger 17 is raised until the channel 22 comes into direct alinement with the inlet 3, at which time a free access from the boiler is permitted through the outlet 4. It will be clear that no matter how much dirt, sediment or scale may be discharged through the blow-out it will be impossible for any of the same to come in contact with the operating walls of the plunger 17, while at the same time the annular seat itself is doubly protected by the packing 24 and sleeve 25. When the hand wheel 15 is turned to close the inlet 3, thus shutting off the blow-off, it will be seen that when nearly in closed position the flange 29 of the plunger 17 will contact with the annular ring 28 and force the same down so as to compress the several sets of packing, whereby an automatic adjustment of the packing is made possible at each closing of the valve. Especial attention is directed to this feature of adjusting the packing by the same hand wheel that operates the valve, since by this construction there are no other adjusting means necessary on the valve and the adjusting may be accurately controlled by the same wheel that operates the valve. It is to be noted that the packing adjusting means, as also the means for holding the plunger against rotation, are both preferably exterior of the casing, thereby bringing them entirely out of contact with the blow off products. When moving parts are located within the casing, the sediment and the like in the blow off must necessarily corrode and prevent operation of the valve when desired.

It is well known to those familiar with the conditions under which a blow-off valve operates, that it is extremely difficult, owing to the severe conditions to which they are subjected, to maintain such a valve any length of time free from scale and sediment, which soon accumulate on the seat of the valve.

I am aware that various forms of valves for accomplishing this end have heretofore been devised, but owing to their complicated structures, fail to perform the functions intended and in view of the many adjustments, soon become inoperative by the unskilled manipulator.

It is to be noted that in the valve herein disclosed all adjustments necessary may be made by direct operation of the hand wheel, whereby I have combined a valve simple and inexpensive, which can be manufactured economically and the same operates to make an absolutely tight joint when closed, and which in open position does not expose any of the working parts to contact with the scale or sediment.

Having thus described my invention, what I claim as new and desire to secure by Letters Patent, is:—

1. In a device of the character described, a casing having inlet and outlet openings, a plunger in said casing having a channel therethrough, packing surrounding said plunger above and below one of said openings, means to operate said plunger, and means on said plunger exterior of the casing to adjust said packing.

2. In a device of the character described, a casing having inlet and outlet openings, a plunger in said casing having a channel therethrough, packing surrounding said plunger above and below one of said openings, lugs on said plunger exterior of said casing adapted to compress said packing, and means to operate said plunger.

3. In a device of the character described, a casing having an inlet and outlet opening, a plunger in said casing, annular packing surrounding said plunger above and below one of said openings, means to shift said plunger to establish communication between said inlet and outlet openings, and means on said plunger exterior of said casing for compressing said packing.

4. In a device of the character described, a casing having inlet and outlet openings, a plunger in said casing having a channel therethrough, packing surrounding said plunger above and below one of said openings, means for moving said plunger, and a device exterior of said casing actuated by said means to adjust said packing.

5. In a device of the character described, a casing having inlet and outlet openings, a plunger in said casing having a channel therethrough, packing surrounding said plunger above and below one of said openings, a yoke secured to said casing, a stem connected to said plunger and coöperating with said yoke to partially withdraw said plunger from said casing, means to prevent rotation of said plunger, and means to adjust said packing by the movement of said plunger.

JOHN V. SCHMID.

Witnesses:
ROBERT M. BARR,
C. D. McVAY.